United States Patent
Jung et al.

(10) Patent No.: US 9,448,756 B2
(45) Date of Patent: **\*Sep. 20, 2016**

(54) MANAGING OBSTRUCTED VIEWS OF MULTIPLE DISPLAY SURFACES

(71) Applicant: SEARETE LLC, Bellevue, WA (US)

(72) Inventors: Edward K. Y. Jung, Bellevue, WA (US); Alexander J. Cohen, Mill Valley, CA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,418

(22) Filed: Nov. 24, 2015

(65) Prior Publication Data

US 2016/0147493 A1   May 26, 2016

Related U.S. Application Data

(63) Continuation-in-part of application No. 12/006,236, filed on Dec. 31, 2007, now Pat. No. 9,196,224.

(51) Int. Cl.
*G06F 3/14* (2006.01)

(52) U.S. Cl.
CPC .................................. *G06F 3/1423* (2013.01)

(58) Field of Classification Search
None
See application file for complete search history.

(56) References Cited

U.S. PATENT DOCUMENTS

| | | | |
|---|---|---|---|
| 6,710,789 B1* | 3/2004 | Sekiguchi | G06F 3/14 348/E5.104 |
| 2007/0152977 A1* | 7/2007 | Ng | G06F 3/03547 345/173 |
| 2007/0245024 A1* | 10/2007 | Prus | G11B 15/689 709/226 |
| 2007/0252804 A1* | 11/2007 | Engel | G09G 3/36 345/98 |
| 2007/0273609 A1* | 11/2007 | Yamaguchi | G06F 3/1423 345/1.1 |
| 2009/0002327 A1* | 1/2009 | Wilson | G06F 3/041 345/173 |

\* cited by examiner

*Primary Examiner* — Ryan A Lubit

(57) ABSTRACT

Embodiments of systems and methods for managing multiple overlapping electronic displays are disclosed, including the electronic displays of electronic paper, electronic books, computer monitors, and other electronic display devices. In one embodiment, a method includes sensing an overlap area of a first display and a second display relative to a specified view location, determining a nearest unobstructed display to the specified view location, and displaying within the overlap area of the nearest unobstructed display a highest priority information from among first and second information.

19 Claims, 8 Drawing Sheets

MANAGING OBSTRUCTED VIEWS OF MULTIPLE DISPLAY SURFACES

If an Application Data Sheet (ADS) has been filed on the filing date of this application, it is incorporated by reference herein. Any applications claimed on the ADS for priority under 35 U.S.C. §§119, 120, 121 or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc. applications of the Priority Application(s)). In addition, the present application is related to the "Related Application(s)," if any, listed below:

PRIORITY APPLICATIONS

For purposes of the USPTO extra-statutory requirements, the present application constitutes a continuation-in-part of U.S. patent application Ser. No. 12/006,236, entitled MANAGING OBSTRUCTED VIEWS OF MULTIPLE DISPLAY SURFACES, naming Edward K. Y. Jung; Alexander J. Cohen, Royce A. Levien; Robert W. Lord; Mark A. Malamud; and John D. Rinaldo, Jr. as inventors, filed Dec. 31, 2007 with (now SE1-0006-US), which is currently co-pending or is an application of which a currently co-pending application is entitled to the benefit of the filing date.

RELATED APPLICATIONS

None.

The United States Patent and Trademark Office (USPTO) has published a notice to the effect that the USPTO's computer program require that patent applications both reference a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listing of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

FIELD OF THE DISCLOSURE

The present disclosure relates generally to managing multiple display surfaces, including managing multiple overlapping electronic displays such as those of computer monitors, electronic paper (e-paper), books, and other types of electronic display devices.

BACKGROUND

Electronic display surfaces are used to convey information in an increasing number of applications and environments. In addition to the ubiquitous computer monitor, electronic displays appear in such devices as personal data assistants, communication and navigation devices, electronic paper, electronic books and magazines, table tops, seat backs, and numerous other forms of display devices.

In particular, electronic paper (sometimes called electric paper or "e-paper") has begun to replace legacy paper as an information source. It has many of the attributes of paper, including being writable, reflective and stable. Electronic paper can advantageously be configured in relatively thin, flexible sheets, allowing it to be stacked, handled, and stored much like conventional paper.

Electronic displays may also suffer from some of the same drawbacks as conventional devices. For example, as with conventional paper, books, signs and the like, overlapping portions of electronic displays may cause some of the available information to be obscured from view. Also, one of the recognized advantages of modern electronic display media such as e-paper, that of ease of updating displayed information, may be lost due to overlapping displays which prevent a user from appreciating that displayed information has been updated.

SUMMARY

Embodiments of systems and methods for managing multiple overlapping electronic displays are disclosed, including the electronic displays of computer monitors, electronic paper, electronic books, and other electronic display devices. Systems and methods in accordance with the teachings of the present disclosure may allow the recognized advantages of electronic display media to be maintained and enhanced over conventional display media, even when such electronic display media are overlapping.

For example, in one embodiment, an electronic display apparatus includes a first display configured to display a first information, and one or more sensors configured to detect at least one other display device relative to the first display. A processing component is operatively coupled to the first display and the one or more sensors. The processing component is configured to determine an overlap area of the first display and the at least one other display device relative to a specified view location; determine from among the first display and the at least one other display device a nearest unobstructed display to the specified view location; and operatively communicate with the at least one other display device to cooperatively enable to be displayed within the overlap area of the nearest unobstructed display a highest priority information from among the first information and other information displayed by the at least one other display device.

In another exemplary embodiment, a system for electronically displaying information includes a first display configured to display a first information, a second display configured to display a second information, and one or more sensors configured to detect at least one of the first and second displays relative to another of the first and second displays. At least one processing component is operatively coupled to the first and second displays and to the one or more sensors, and is configured to determine an overlap area of the first and second displays relative to a specified view location; determine a nearest unobstructed display to the specified view location from among the first and second displays; determine a highest priority information from among the first and second information; and control the nearest unobstructed display to display at least a portion of the highest priority information within the overlap area of the nearest unobstructed display.

In another embodiment, a method of operating displays comprises sensing an overlap area of a first display and a second display relative to a specified view location, and determining a nearest unobstructed display to the specified view location. The method further includes displaying within the overlap area of the nearest unobstructed display a highest priority information from among first and second information displayable on the first and second displays, respectively.

In yet another exemplary embodiment, a method of operating multiple displays includes determining an overlap area of a first display and a second display relative to a specified view location; determining from among the first and second displays a nearest unobstructed display to the specified view location; determining a highest priority information from among the first and second information; determining a highest priority information from among a first information displayable on the first display and a second information displayable on the second display; and controlling the nearest unobstructed display to display at least a portion of the highest priority information within the overlap area of the nearest unobstructed display.

In another embodiment, a system for electronically displaying information includes a first display configured to display a first information including a plurality of regions of differing priority, and a second display configured to display a second information. One or more sensors are configured to detect at least one of the first and second displays relative to another of the first and second displays. At least one processing component operatively coupled to the first and second displays and to the one or more sensors, and being configured to determine an overlap area of the first and second displays relative to a specified view location; determine a priority ranking of the plurality of regions; and re-position at least some of the plurality of regions within an un-obscured portion of the first display based on the priority ranking.

In a further embodiment, a system for electronically displaying information includes a first display configured to display a first information, wherein the first information includes a plurality of regions of differing priority, and a second display configured to display a second information. One or more sensors configured to detect at least one of the first and second displays relative to another of the first and second displays. At least one processing component operatively coupled to the first and second displays and to the one or more sensors, and being configured to: determine an overlap area of the first and second displays relative to a specified view location; determine a priority ranking of the plurality of regions; and re-position at least some of the plurality of regions within an un-obscured portion of the first display based on the priority ranking.

In yet another embodiment, a method of operating displays includes sensing an overlap area of a first display and a second display relative to a specified view location; determining a nearest unobstructed display to the specified view location from among the first and second displays, another of the first and second displays displaying a plurality of regions of differing priority; determining a priority ranking of the plurality of regions; and re-positioning at least some of the plurality of regions within an un-obscured portion of the other of the first and second displays based on the priority ranking.

In still another embodiment, a method of operating multiple displays includes determining an overlap area of a first display and a second display relative to a specified view location; determining from among the first and second displays a nearest unobstructed display to the specified view location, another of the first and second displays displaying a plurality of regions of differing priority; determining a priority ranking of the plurality of regions; and re-positioning at least some of the plurality of regions within an un-obscured portion of the other of the first and second displays based on the priority ranking.

Additional features, aspects and benefits will be understood by those skilled in the art from the following drawings and detailed description for various exemplary and preferred embodiments.

DETAILED DESCRIPTION

Techniques for managing multiple overlapping electronic displays are disclosed herein, including techniques for managing displays of computer monitors, electronic paper, electronic books, and any other suitable electronic display devices. Many specific details of certain embodiments are set forth in the following description, and in FIGS. 1-14, to provide a thorough understanding of such embodiments. One skilled in the art will understand from the teachings of the present disclosure, however, that the present disclosure may have other possible embodiments, and that such other embodiments may be practiced without some of the details set forth in the following description.

Generally, embodiments of systems and methods in accordance with the present disclosure may prevent certain information from being obscured from a user's view by overlapping portions of multiple electronic displays. More specifically, such embodiments of systems and methods may detect areas of overlap between electronic displays, determine a highest priority information, and for each overlap area, cause to be displayed on a nearest unobstructed display to the user the highest priority information within the overlap area.

Exemplary Environments, Display Devices, and Display Processes

Figure 1:
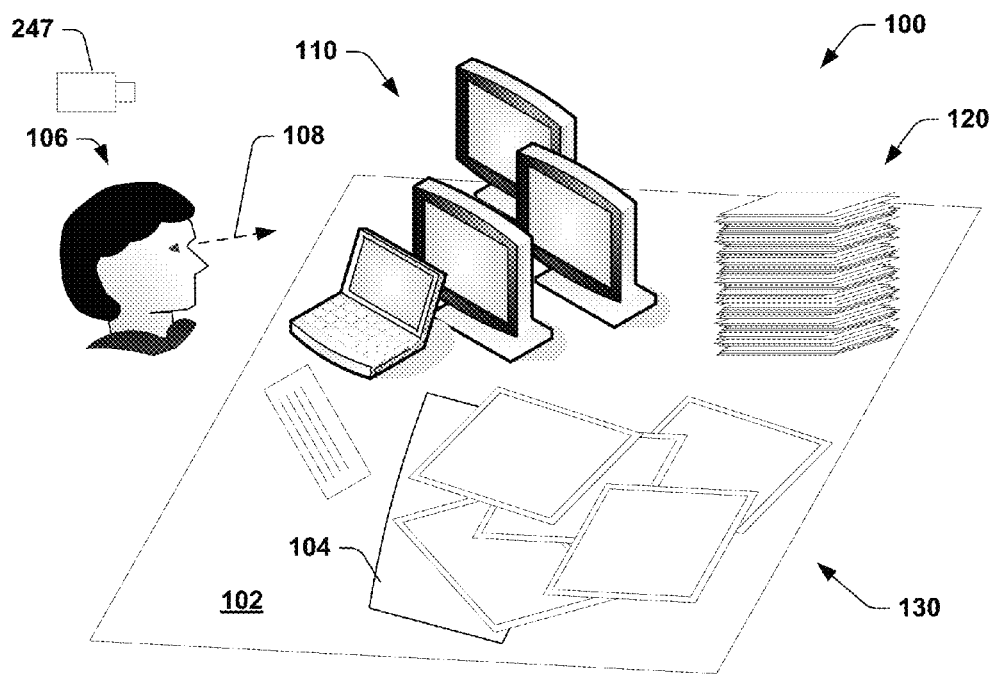
FIG. 1 is a perspective view of an environment including electronic display devices configured in accordance with various embodiments of the present disclosure.

FIG. 1 is a perspective view of an environment 100 including electronic display devices configured in accordance with various embodiments of the present disclosure. The environment 100 includes a plurality of computer monitors 110, a plurality of electronic books 120, and a plurality of electronic papers 130 distributed on a work surface 102. The work surface 102 includes an embedded display 104 that is partially covered by the plurality of electronic papers 130. A user 106 views along a user viewpoint (or line of sight) 108 toward the plurality of computer monitors 110.

In the following description, electronic paper devices (e.g. electronic papers 130) may be discussed collectively with electronic display devices for the sake of brevity and simplicity. It should be noted, however, that the technologies involved in electronic papers are typically different from technologies of electronic display devices. The technologies involved in electronic paper are unique.

From the perspective of the user 106, the plurality of computer monitors 110 are overlapping such that (absent techniques in accordance with the present disclosure) the computer monitors nearer to the user 106 may partially obscure some portions of the computer monitors that are farther from the user 106. Similarly, the uppermost electronic papers may obscure portions of the lower electronic papers from the user's view, and the uppermost electronic books may obscure portions of the lower electronic books from the user's view.

It will be appreciated that the user viewpoint 108 (or specified view location) may impact the relative amounts of display overlap for some environments and implementations, and may have little or no impact for others. For example, referring again to FIG. 1, the user viewpoint 108 may have a greater impact on the amount of overlap between the plurality of computer monitors 110 than on the amount of overlap between the plurality of electronic papers 140. For the plurality of electronic books 120 stacked on the work surface 102, the user viewpoint 108 may have practically no effect since the amount of overlap is approximately one hundred percent. In the following discussion, embodiments of systems and methods in accordance with the present disclosure may be described assuming that the user viewpoint 108 (or specified view location) is generally known (e.g. an assumed reference point, input by the user 106, or other suitable determination method) without the need to actively sense or otherwise determine the position of the user 106. In various embodiments, for example, a user viewpoint (or specified view location) 108 may include specific position information such as a user's location, or general position information such as "above the table," "in the room," and "from the street," and locations where someone could be (or not). The particular embodiment shown in FIG. 1 that includes the user 106 is merely exemplary.

Figures 2, 3:
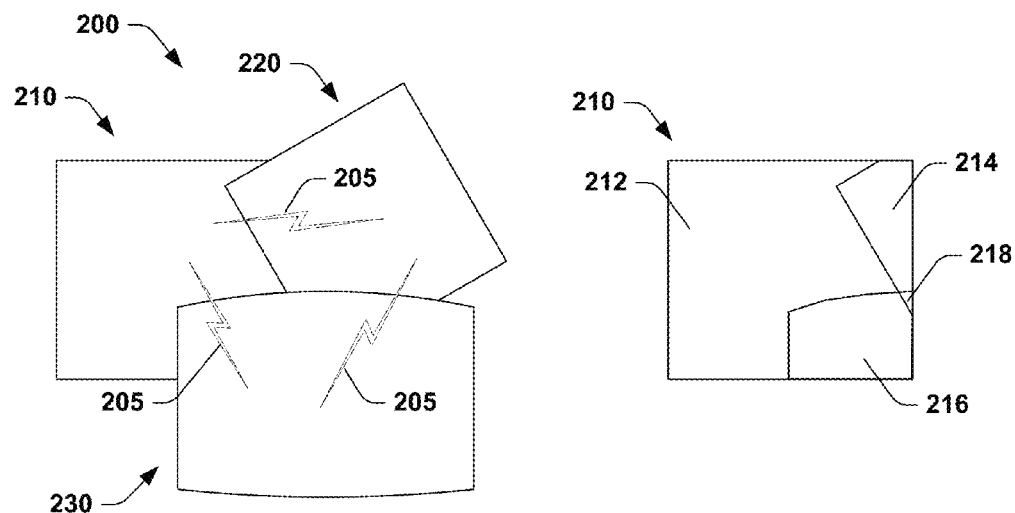
FIG. 2 is an elevational view of a plurality of overlapping displays in accordance with an embodiment of the present disclosure.
FIGS. 3 and 4 are elevational views of a first display of the plurality of overlapping displays of FIG. 2.

Embodiments of systems and methods in accordance with the present disclosure will now be described with reference to a representative case of three overlapping displays. More specifically, FIG. 2 is an elevational view of a plurality of overlapping displays 200 in accordance with an embodiment of the present disclosure, including (from background to foreground) a first display 210, a second display 220, and a third display 230. In this embodiment, each of the overlapping displays 210, 220, 230 may communicate signals 205 with the other overlapping displays in order to prevent certain information from being obscured from a user's view, as described more fully below. It will be appreciated that the overlapping displays 210, 220, 230 may represent one or more of computer monitors, electronic papers, electronic books, or any other suitable electronic display devices, and that the techniques disclosed herein may be extended to any desired number n of overlapping display devices (i.e. where n>1).

FIG. 3 shows the first display 210 of the plurality of overlapping displays 200 of FIG. 2. The first display 210 includes a first, non-obscured portion 212 that can be viewed directed by the user 106. A second portion 214 of the first display 210 is overlapped by the second display 220 (from the user's viewpoint 108), and a third portion 216 is overlapped by the third display 230. In the embodiment shown in FIG. 3, a fourth portion 218 of the first display 210 is overlapped by both the second and third displays 220, 230. Of course, in alternate embodiments, the number, shape, and extent of the overlap areas between the displays 210, 220, 230 may vary (increase or decrease) from those portions 212-218 shown in FIG. 3.

Figure 4:
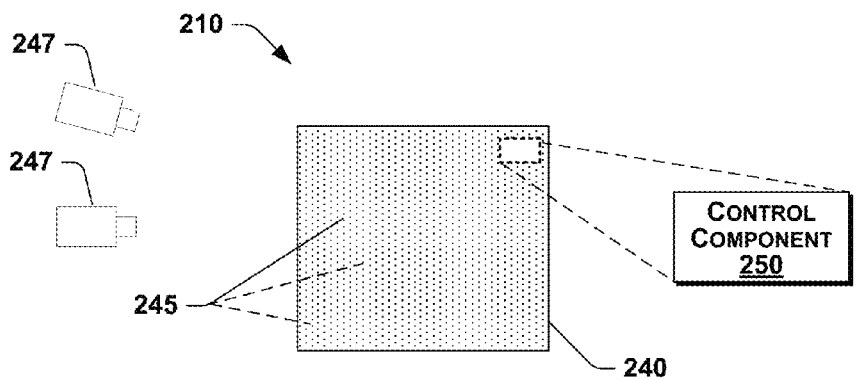

FIG. 4 is a schematic view of the first display 210 of FIG. 2 in accordance with one embodiment of the present disclosure. In this embodiment, the first display 210 includes a display member 240 operatively coupled to a control component 250. One or more sensors 245 are coupled to the display member 240. The sensors 245 are configured to detect other displays (e.g. second and third displays 220, 230) that may be situated between the display member 240 and the user 106. In the embodiment shown in FIG. 4, the control component 250 is depicted as being located within a particular portion of the first display 210, however, in alternate embodiments, the control component 250 may be located in (or distributed throughout) any suitable portion of the first display 210.

In addition, it will be appreciated that a variety of existing sensing technologies may be used for the sensors 245, including active sensing elements, passive sensing elements, contact sensing elements, and non-contact (or wireless) sensing elements. In some embodiments, the sensors 245 may be based on force or pressure (i.e. physical contact) sensors, or electrical signals, infrared signals, acoustic signals, optical signals, magnetic fields, or any other suitable sensing technologies. The term wireless as used herein means using any frequency in the electromagnetic spectrum or the acoustic spectrum to transmit or receive data without the use of a physical connection, such as a wire, a fiber, or other physical element. Thus, wireless links include, but are not limited to, radio links, optical links or acoustic links. Infrared and ultraviolet links are specific examples of optical links.

In some embodiments, the sensors 245 may be based on imaging (or machine vision) technologies that "see" other objects. Examples of suitable imaging technologies include those imaging systems commercially-available from Cyra Technologies, Inc. of San Ramon, Calif., or radar and laser radar (or ladar) systems, such as, for example, the LR200 laser radar system commercially-available from Leica Geosystems, Inc. of Heerbrugg, Switzerland. Alternately, the sensors 245 may be a laser-based technology, such as a laser-based point tracking system of the type commercially-available from Automated Precision, Inc. of Rockville Md., or a laser scanner system, such as those systems commercially-available from Mensi, Inc. of Alpharetta, Ga., or a laser radar system, such as those generally disclosed, for example, in U.S. Pat. No. 5,202,742 issued to Frank et al., U.S. Pat. No. 5,266,955 issued to Izumi et al., and U.S. Pat. No. 5,724,124 issued to Kai. In some implementations, the sensors 245 may be distal from the one or more display devices, such as a distal sensor 247 (e.g., security camera, web camera, CCTV camera, etc. located above/to the side of the one or more display devices); the sensors 245 are shown herein in the context of the one or more display devices for sake of illustration.

Further embodiments of suitable sensing technologies that may be used by the sensors 245 include acoustic or sonar-based technologies, such as the type described, for example, in High Resolution Maps from Wide Angle Sonar by Moravec et al. of The Robotics Institute of Carengie-Mellon University, or point tracking technologies like those systems commercially-available from Automated Precision, Inc. of Rockville, Md. In still other embodiments, the sensors 245 may be based on infrared sensing technologies, including, for example, those infrared positioning technologies that use infrared pulses and photo receivers to determine, for example, angle and position information based on the timing of the infrared pulses received. Existing infrared-based systems include, for example, those systems currently available from ArcSecond, Inc. of Dulles, Va., and those systems generally disclosed, for example, in U.S. Pat. No. 5,589,835 issued to Gildea et al., U.S. Pat. No. 6,452,668 B1, issued to Pratt, and U.S. Pat. Nos. 6,501,543 B2, 6,535,282 B2, 6,618,133 B2, and 6,630,993 B1 issued to Hedges et al., which patents are incorporated herein by reference.

In addition, the sensors 245 may be based on radio frequency identifier (RFID) technologies. The sensors 245 may, for example, detect RFID signals emitted by objects (e.g. other displays) positioned proximate to the sensors 245, and may determine the overlap areas of the display element 240 that are obscured by such proximate objects with respect to a particular user viewpoint 108. As used herein, the term radio frequency identifier (RFID) includes any type of tag, system, or device that operates using radio frequency (RF) signals. The RFID signals may be emitted or detected by a variety of RFID information storage mechanisms that may be referred to as a tag, transponder, electronic label, code plate, and various other terms. Such RFID devices may incorporate the use of electromagnetic or electrostatic coupling in the radio frequency portion of the spectrum to communicate to or from an RFID tag through a variety of modulation and encodation schemes. For example, in some embodiments, techniques disclosed herein may be used in association with RFID signals that comply with Electronic Product Code (EPC) standards and specifications, such as those RFID tags commercially-available from Remote Identity, LLC of Erie, Colo.

Figure 5:
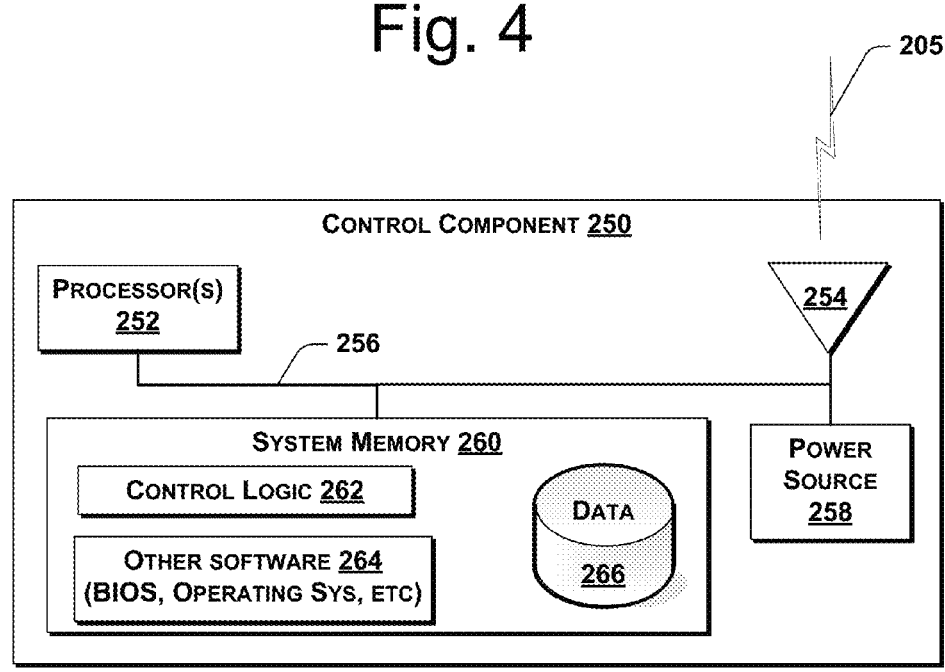
FIG. 5 is a schematic view of a control component of the first display of FIG. 4.

FIG. 5 is a schematic view of the control component 250 of the first display 210 of FIG. 4. In this embodiment, the control component 250 includes one or more processors 252 and one or more input/output (I/O) devices 254 coupled to a system memory 260 by a bus 256. More specifically, in some embodiments, the I/O device 254 includes a wireless communication device configured to communicate the wireless signals 205 to and from the other displays 220, 230, as shown in FIG. 2. The I/O device 254 may include, for example, one or more antenna, photo-detectors, photo-diodes, transmitters, receivers, transceivers, or any other suitable wireless communication devices. A power source 258 (e.g. a battery) provides power to the various parts of the control component 250.

The system memory 260 may include computer-readable media configured to store data and/or program modules for implementing the techniques disclosed herein. More specifically, the system memory 260 may include a control logic (or software) 262 and data 266 that may be accessed by (and executed on) the processor 252. The system memory 260 may also store other software 264 embodying instructions, routines, and methodologies used to carry out the desired functionalities of the control component 250, such as, for example, a basic input/output system (BIOS), an operating system, one or more application programs, or any other suitable information.

It will be appreciated that the system memory 260 may include any available computer-readable media that may be accessed by the processor 252, including computer storage media and communication media. Computer storage media may include volatile and nonvolatile, and removable and non-removable media, implemented in any method or technology for storage of information such as computer-readable instructions, data structures, program modules, or other data. Suitable computer storage media includes, but is not limited to, and random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information.

Similarly, communication media typically embodies computer-readable instructions, data structures, program modules or other data in a modulated data signal or other transport mechanism, and includes any information delivery media. The term "modulated data signal" means a signal that has one or more of its characteristics set or changed in such a manner as to encode information in the signal. By way of example, and not limitation, suitable communication media includes wired media, such as a wired network or direct-wired connection, and/or other suitable media recognized by those of skill in the art. Combinations of any of the above are also included within the scope of computer readable media.

Generally, program modules executed on the control component 250 (FIG. 5) may include routines, programs, objects, components, data structures, etc., for performing particular tasks or implementing particular abstract data types. These program modules and the like may be executed as native code, or may be downloaded and executed such as in a virtual machine or other just-in-time compilation execution environments. Typically, the functionality of the program modules may be combined or distributed as desired in various implementations.

Figure 6:
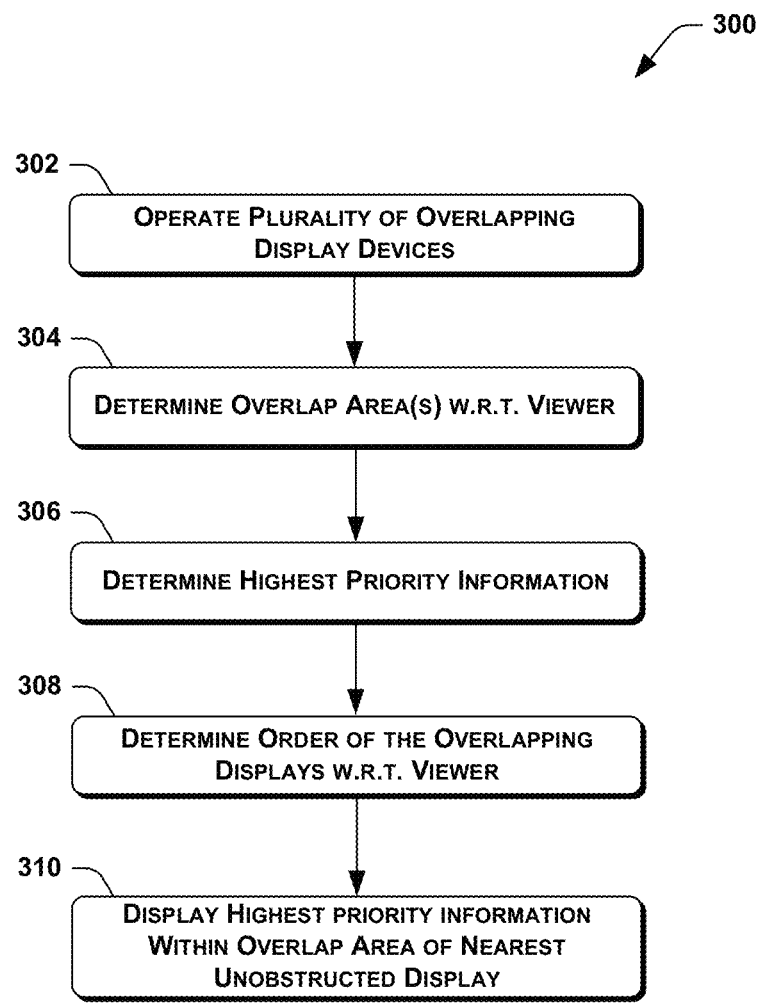
FIG. 6 is a method of operating multiple displays in accordance with another embodiment of the present disclosure.

FIG. 6 shows a method 300 of operating multiple displays in accordance with another embodiment of the present disclosure. For simplicity, the method 600 will be described with reference to the exemplary environment and display devices described above with reference to FIGS. 1-5. The exemplary method 300 is illustrated in FIG. 6 as a collection of blocks in a logical flow graph, which represents a sequence of operations that can be implemented in hardware, software, firmware, or any suitable combination thereof. In the context of software, the blocks may represent computer instructions that, when executed by one or more processors, perform the recited operations.

The method 300 includes operating a plurality of overlapping display devices at 302. The overlapping display devices may include, for example, computer monitors, electronic papers, electronic books, or any other suitable electronic display devices. In a particular embodiment, the operating of the plurality of overlapping display devices at 302 includes simultaneously operating a first display 210 to display a first information, a second display 220 to display a second information, and a third display 230 to display a third information.

At 304, one or more overlap areas (or obscured areas) of the plurality of overlapping display devices are determined with respect to a specified view location (or viewpoint). In some embodiments, the overlap areas are determined using sensors 245 that operate using one or more sensing technologies. The sensing technologies may include active sensing elements, passive sensing elements, contact sensing elements, and non-contact (or wireless) sensing elements. In a particular embodiment, for example, a first display 210 includes a first portion 212 that is un-obscured, a second portion 214 that is overlapped by a second display 220, a third portion 216 that is overlapped by a third display 230, and a fourth portion 218 that is overlapped by both the second and third displays 220, 230.

The method 300 determines a highest priority information from among the various information displayed by the plurality of overlapping display devices within the one or more overlap areas at 306. For example, in some embodiments, the highest priority information may be based on user-specified preferences, information age (e.g. updated or most current information given higher priority), information relevance to the user, general rules of information prioritization (e.g. source, topic, media type, etc.), or any other suitable ranking methodology. In a particular embodiment, the highest priority information may be determined from among first, second, and third information displayed by first, second, and third displays, respectively.

At 308, an order of the plurality of overlapping displays (e.g. nearest to farthest) with respect to the user viewpoint is determined. For example, in a particular embodiment, the first display 210 may be determined to be the furthest display from the user viewpoint, the third display 230 may be the nearest display to the user viewpoint, and the second display 220 may be situated between the first and second displays 210, 230 with respect to the user viewpoint.

Next, at 310, the highest priority information is displayed within the overlap area(s) of the nearest unobstructed display(s). For example, with reference to FIGS. 2 and 3, if the first information displayed by the first display 210 is determined to be the highest priority information, the method 300 examines the second portion 214 (overlapped by the second display 220), determines that the second display 220 is the nearest unobstructed display for that particular overlap area (214), and displays that portion of the first information that lies within the second portion 214 in the corresponding overlap area on the second display 220. Similarly, the method 300 examines the third portion 216 (overlapped by the third display 230), determines that the third display 230 is the nearest unobstructed display for that particular overlap area (216), and displays that portion of the first information that lies within the third portion 216 in the corresponding overlap area on the third display 230. Finally, the method 300 examines the fourth portion 218 (overlapped by the second and third displays 220, 230), determines that the third display 230 is the nearest unobstructed display for that particular overlap area (218), and displays that portion of the first information that lies within the fourth portion 218 in the corresponding overlap area on the third display 230.

Thus, the first, second, and third displays 210, 220, 230 cooperatively display the highest priority information to the user 106 in an unobstructed manner. More specifically, between the first unobstructed portion 212 of the first display 210, the overlap area (214) of the second display 220, and the overlap areas (216, 218) of the third display 230, the highest priority information is displayed in an unobstructed manner to the user 106. The method 300 may be repeated indefinitely and at a suitable frequency such that as one or more of the displays 210, 220, 230 are moved (e.g. translated, rotated, etc), or as information updates become available, the method 300 will operate to ensure that highest priority information does not become or remain obscured from the user's view.

The method 300 is one of many possible implementations in accordance with the teachings of the present disclosure. It will be appreciated that, in alternate implementations, certain acts need not be performed in the order described, and may be modified, and/or may be omitted entirely, depending on the circumstances. Moreover, in various implementations, the acts described may be implemented by a computer, processor, or other suitable devices and components based on instructions stored on one or more computer-readable media. The computer-readable media can be any available media that can be accessed by a computing device to implement the instructions stored thereon.

Embodiments of systems and methods in accordance with the teachings of the present disclosure may provide considerable advantages. For example, because the overlapping electronic displays cooperatively ensure that the highest priority information is displayed in an unobstructed manner to the user 106, such electronic displays may overcome some of the drawbacks of conventional devices so that highest priority information is not obscured from view. Also, the advantage of modern electronic display media such as e-paper to be easily updated with current information may be maintained and enhanced by ensuring that such updated information is made available to the user even when display devices are overlapping.

Additional Embodiments

Figure 7:
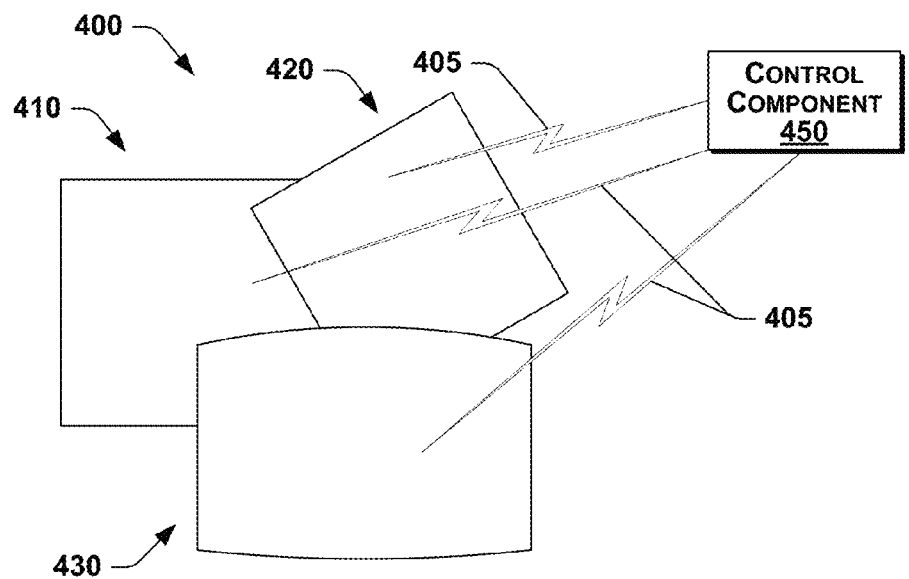
FIG. 7 is an elevational view of a plurality of overlapping displays in accordance with an alternate embodiment of the present disclosure.

It will be appreciated that a variety of alternate embodiments of systems and methods may be conceived, and that the present disclosure is not limited to the particular embodiments described above and shown in FIGS. 1-6. For example, FIG. 7 is an elevational view of a plurality of overlapping displays 400 in accordance with another embodiment of the present disclosure. In this embodiment, each of the overlapping displays 410, 420, 430 communicates signals 405 to a control component 450. The signals 405 may be wireless or non-wireless signals.

Figure 8:
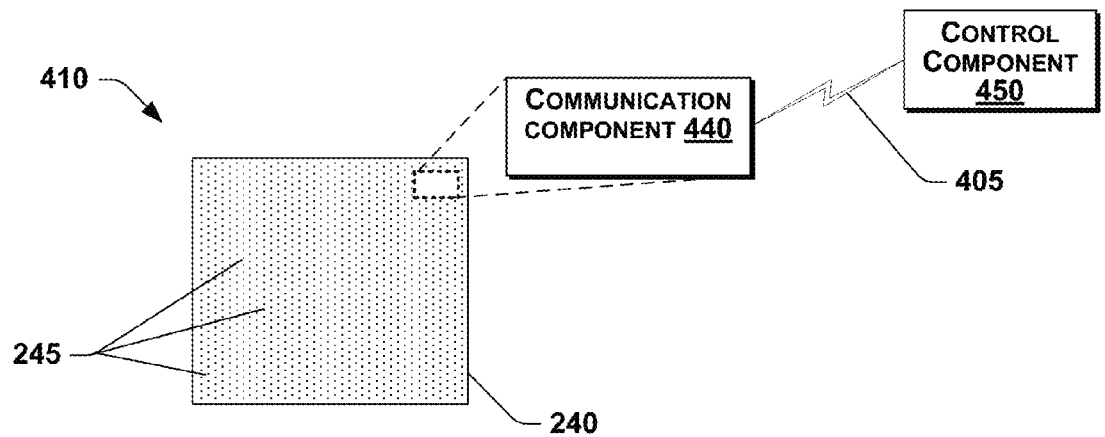
FIG. 8 is a schematic view of a first display of the plurality of overlapping displays of FIG. 7.

FIG. 8 is a schematic view of a first display 410 of the plurality of overlapping displays 400 of FIG. 7. As in a previously-described embodiment, the first display 410 includes a display member 240, and one or more sensors 245 configured to detect other displays (e.g. second and third displays 420, 430). A communication component 440 is operatively coupled to the display member 240 and to the one or more sensors 245. The communication component 440 may include one or more wireless or non-wireless communication devices configured to communicate the signals 405 to and from the control component 450, and to and from the display member 240 and the sensors 245. For example, the communication component 440 may include, for example, one or more antenna, photo-detectors, photo-diodes, transmitters, receivers, transceivers, or any other suitable communication devices.

In operation, data received by the sensors 245 is communicated to the control component 450 by the communication component 440 of each of the displays 410, 420, 430. The control component 450 performs the processing and data manipulation necessary to provide the desired functionality to prevents a highest priority information from being obscured from a user's view, as described more fully above with respect to FIG. 6. Thus, the control component 450 in cooperation with the plurality of overlapping displays 400 causes the highest priority information to be displayed within the overlap areas of the unobstructed displays nearest to the user.

Figure 9:
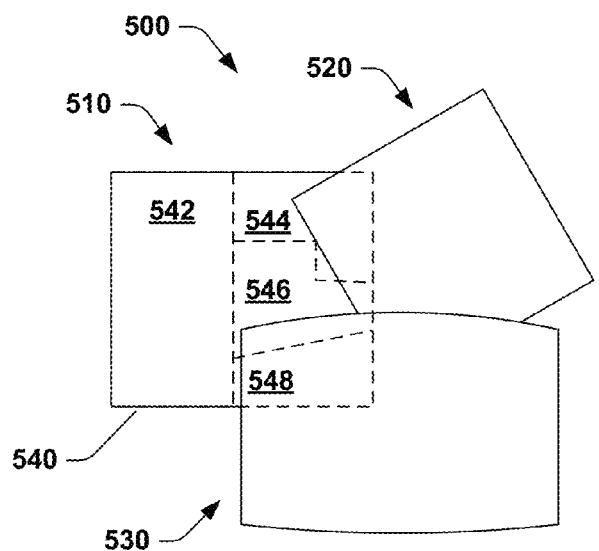
FIG. 9 is an elevational view of a plurality of overlapping displays in accordance with another alternate embodiment of the present disclosure.
Figure 10:
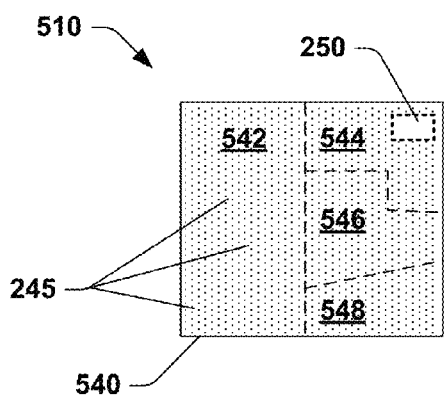
FIG. 10 is a schematic view of a first display of the plurality of overlapping displays of FIG. 9.

FIG. 9 is an elevational view of a plurality of overlapping displays 500 in accordance with another alternate embodiment of the present disclosure. The plurality of overlapping displays 500 includes first, second, and third displays 510, 520, 530. As best shown in FIG. 10, the first display 510 includes a display member 540, one or more sensors 245 configured to detect other displays (e.g. second and third displays 520, 530), and a control component 250 (or communication component) that operatively communicates and processes signals to provide the desired functionality.

In this embodiment, however, the first display 510 (and the second and third displays 520, 530) may display different portions of information having a variety of different priority rankings. For example, a first information may be displayed in a first region 542 of the display member 540, a second information may be displayed in a second region 544 of the display member 540, and third and fourth information may be displayed in third and fourth regions 546, 548 of the display member 540, respectively. In this way, the determination of the highest priority information that is to be displayed within the overlap area on the nearest unobstructed display to the user may be based on the relative priorities of the information displayed within each of the regions 542-548 of the display member 540.

For example, FIG. 10 is a schematic view of the first display 510 and the corresponding overlap areas of the plurality of overlapping displays 500 of FIG. 9. As described above with respect to FIG. 3, the first display 510 includes a first, non-obscured portion 212, a second portion 214 overlapped by the second display 520, and a third portion 216 overlapped by the third display 530, and a fourth portion 218 overlapped by both the second and third displays 520, 530. The relationships between the overlap areas 214-218 and the regions 542-548 containing the information of differing priorities may be determined by the processing components 250 (or processing component 450) so that the displays 510, 520, 530 may cooperatively ensure a highest priority information does not become or remain obscured from the user's view.

In the case where the information displayed within the first region 542 of the first display 510 is the highest priority information, the plurality of overlapping displays 500 determines that the first region 542 falls entirely within the unobstructed portion 212 of the first display 510. Therefore, the highest priority information is un-obscured to the viewer, and there is no need for the second and third displays 520, 530 to display any of the information from the first display 520.

Figure 12:
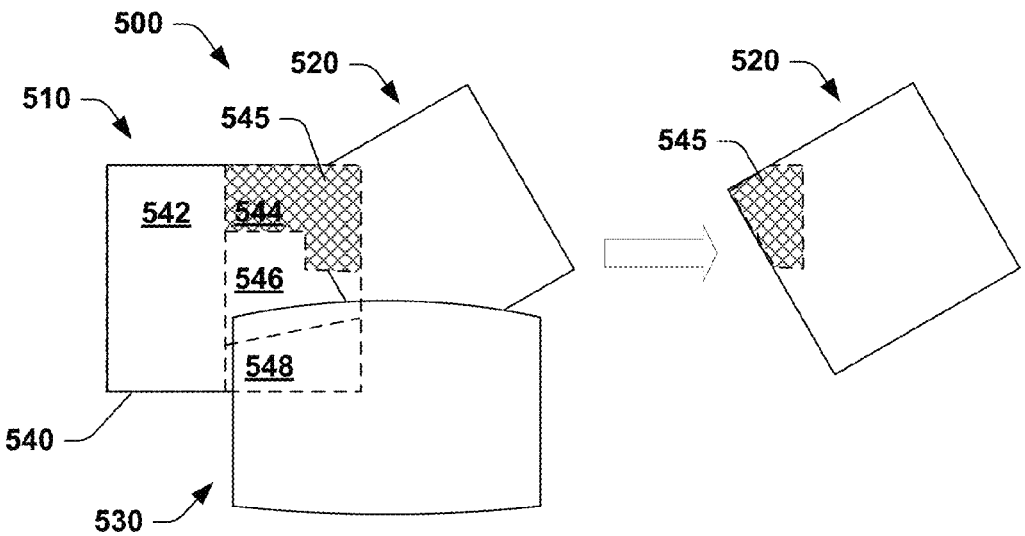
FIGS. 12 and 13 show the plurality of overlapping displays of FIG. 9 while displaying various areas of highest priority information.

Alternately, the highest priority information may be the information displayed within the second region 544 of the first display 510. As shown in FIG. 12, in this case, a section 545 of the information from the second region 544 is displayed by the second display 520 within that part of the second area 214 that overlaps the second region 544 of the first display 510. To better illustrate this operation, the second display 520 is replicated in a right hand portion of FIG. 12 with the section 545 of information that is displayed to the user by the second display 520.

Figure 13:
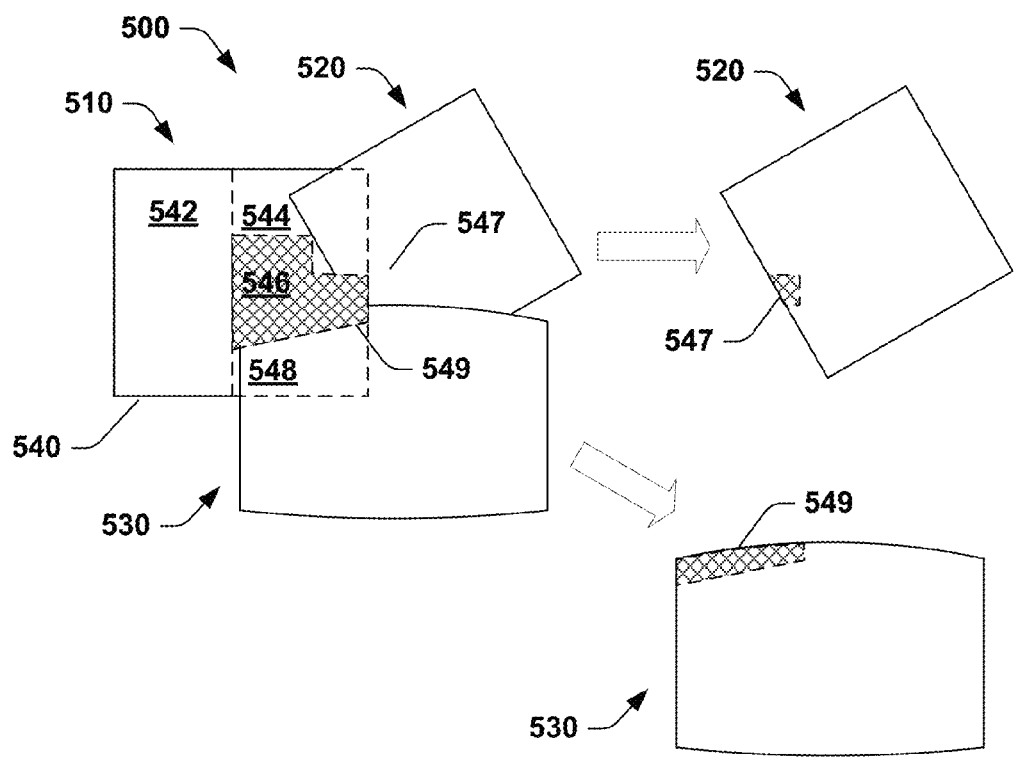

In another case, the highest priority information may be the information displayed within the third region 546 of the first display 510. As shown in FIG. 13, in this case, a first section 547 of the information from the third region 546 is displayed by the second display 520 within that part of the second area 214 that overlaps the third region 546 of the first display 510, and a second section 549 of the information from the third region 546 is displayed by the third display 530 within that part of the third and fourth areas 216, 218 that overlaps the third region 546 of the first display 510. Again, to better illustrate this operation, the second and third displays 520, 530 are replicated in a right hand portion of FIG. 13 with the first and second sections 547, 549 of information that are displayed by the second and third displays 520, 530 being shown.

Figure 11:
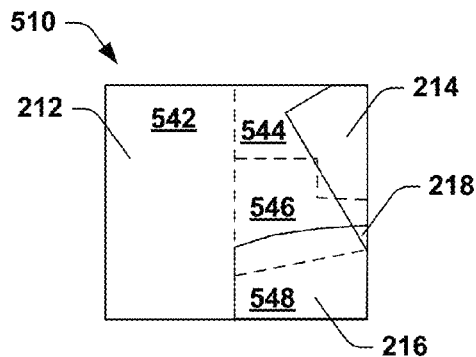
FIG. 11 is the first display and overlap areas of the plurality of overlapping displays of FIG. 9.
Figure 14:
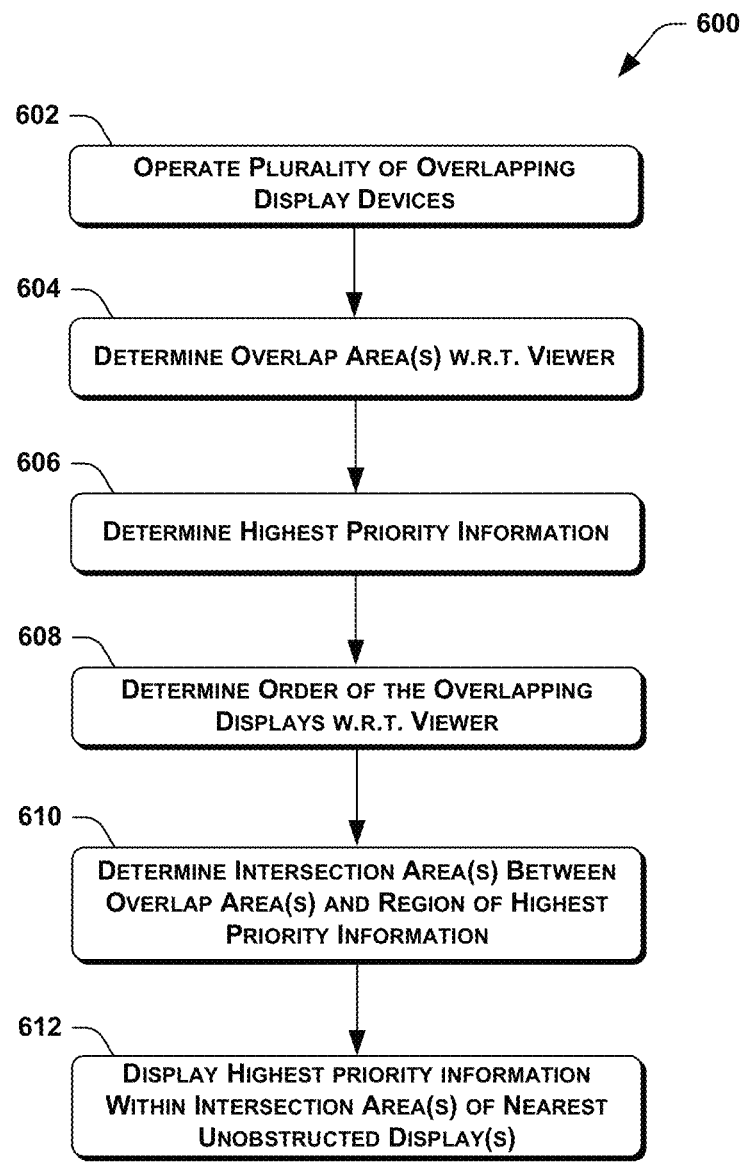
FIGS. 14 and 15 are methods of operating multiple displays in accordance with additional embodiments of the present disclosure.

FIG. 14 is a method 600 of operating overlapping displays, such as the plurality of overlapping displays 500 of FIG. 11. It will be appreciated that many of the functions and operations of the method 600 are similar or identical to those described above with respect to the method 300 shown in FIG. 6. Therefore, for the sake of brevity, differences in the aspects of the method 600 will be described in detail.

At 602, a plurality of overlapping display devices are operated (e.g. plurality of overlapping displays 500) to display various information to a user. In this embodiment, at least some of the plurality of overlapping displays may display different regions of information having different priority levels (e.g. regions 542-548 of first display 510). One or more overlap areas (or obscured areas) of the plurality of overlapping display devices are determined with respect to a specified view location (or viewpoint) at 604.

The method 600 determines a highest priority information from among the various information displayed by the plurality of overlapping display devices within the one or more overlap areas at 606. More specifically, the method 600 examines each display device on a region-by-region basis to determine the highest priority information, and the highest priority information may occupy only part of a particular display. An order of the plurality of overlapping displays (e.g. nearest to farthest) with respect to the user viewpoint is determined at 608.

At 610, one or more intersection areas between the overlap areas and the region of highest priority information are determined. For example, as described with respect to FIG. 12, a single intersection area (e.g. section 545) may be determined. Alternately, as shown in FIG. 13, a plurality of intersection areas (e.g. sections 547, 549) may be determined.

Finally, at 612, the highest priority information from among the different regions of the different displays is displayed within the intersection area(s) of the nearest unobstructed display(s). Thus, the method 600 ensures that the highest priority information does not become or remain obscured from the user's view.

In further embodiments, when a highest priority information is determined to be obscured, rather than causing the highest priority information to be displayed on a nearest un-obscured display, systems and methods in accordance with the present disclosure may cause the highest priority information to be re-positioned to an un-obscured portion of the same display device. The re-positioning of the highest priority information to an un-obscured portion of the same display device may be accomplished in a number of suitable ways, as described more fully below.

For example, referring again to the plurality of display devices 500 shown in FIG. 9, the second display 520 is shown to overlap a substantial portion of the second region 544 of the first display 510. In some embodiments, if it is determined that the information displayed within the second region 544 is of relatively higher priority than the information shown in the un-obscured first region 542, then the control component 250 of the first display 510 may cause the information from the second region 544 to be displayed in at least a portion of the first region 542, ensuring that the higher priority information is visible to the user. In a particular embodiment, the control component 250 may "switch" (or "swap") a second information from the second region 544 with a first information from the first region 542 so that the second information is displayed in the un-obscured first region 542 and the second information is displayed in the obscured (or partially obscured) second region 544. In other embodiments, however, the second information is displayed in the first region 542, and no attempt is made to display the relatively lower priority first information in the second region 544. The first information may merely be stored without being displayed until such time as the first display 510 is un-obscured and all information may again be displayed to the user.

With continued reference to FIG. 9, in further embodiments, the highest priority information contained within the second region 544 may be moved to the un-obscured portions of the first display 510 without preserving the boundaries of the regions 542-548. In other words, because the sensors 245 (FIG. 10) are able to define the overlapped (or obscured) areas of the display device 540, the un-obscured portion of the display device 540 is known, and the information that is intended to be displayed by the first display 510 may be ranked and freely redistributed throughout entire un-obscured portion of display device 540. In some embodiments, the re-locating and displaying of the relatively higher priority information within the un-obscured portion(s) may be accomplished using so-called information "re-flow" or "wrapping," similar to current "text wrapping" capabilities that already exist in some word-processing systems.

Initially, information having a relatively highest priority may be written to the un-obscured portion of the first display 510, followed by slightly lower priority information being written to the un-obscured portion of the first display 510, and so on until the un-obscured portion of the first display 510 is completely filled with displayed information. The information of relatively lower priority that was not included within the un-obscured portion of the first display 510 may be displayed within the obscured portions, or simply not displayed (e.g. stored) until additional portions of the first display 510 are un-obscured. Alternately, the information of relatively lower priority that was not included within the un-obscured portion of the first display 510 may be communicated to another display (e.g. the second display 520) to be displayed, as described above with respect to the previously-described embodiments. Thus, in at least some embodiments in accordance with the present disclosures, techniques for re-positioning of information to un-obscured portions of a display may be combined with techniques for communicating information from obscured portions of a display to un-obscured portions of another display.

Figure 15:
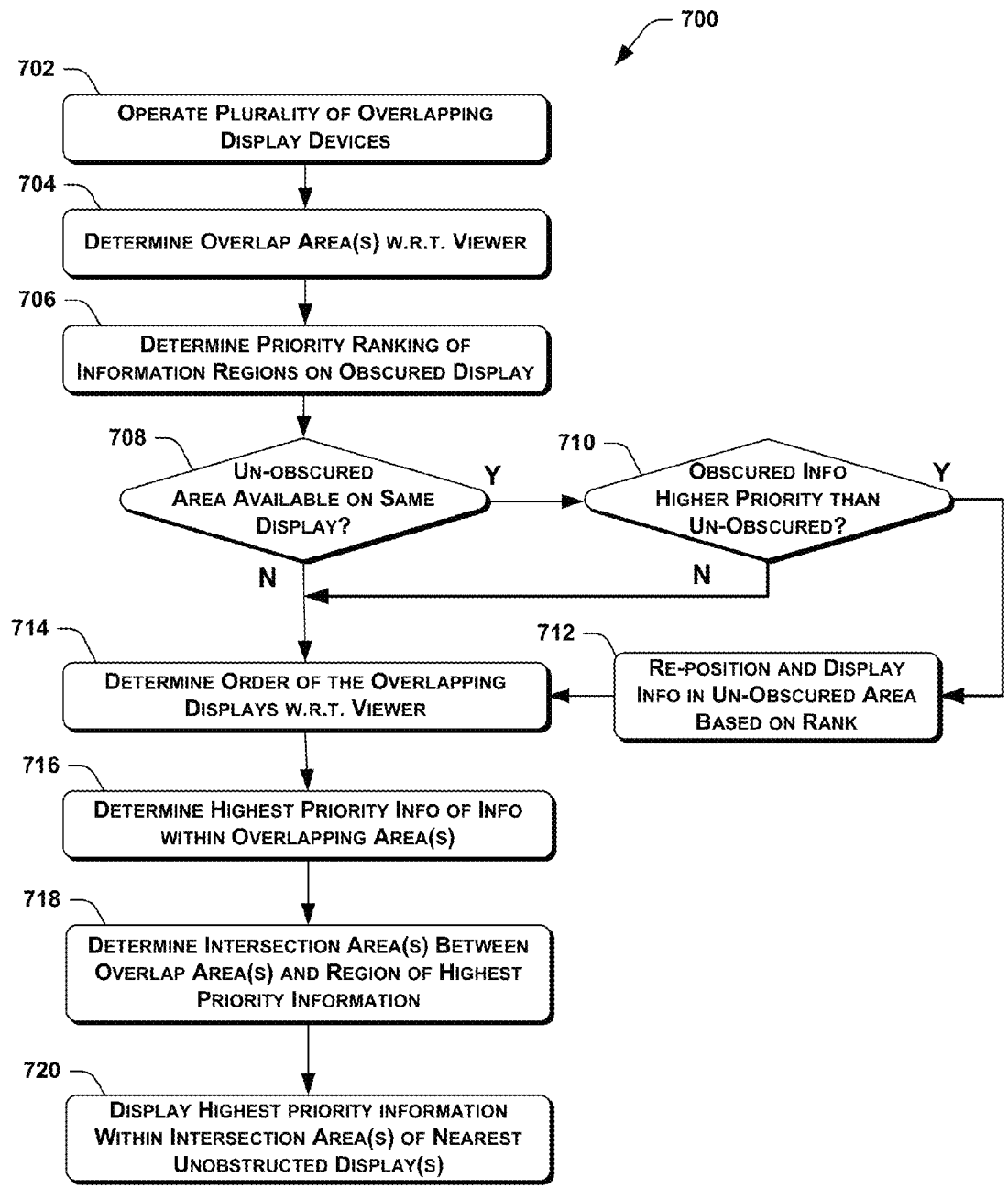

For example, FIG. 15 is a method 700 of operating multiple displays in accordance with another embodiment of the present disclosure. At 702, a plurality of overlapping display devices are operated (e.g. plurality of overlapping displays 500) to display various information to a user. One or more overlap areas (or obscured areas) of the plurality of overlapping display devices are determined at 704.

At 706, the method 700 determines a priority ranking of the information displayed by the obscured display device. For example, in the exemplary embodiment shown in FIG. 9, the method 700 determines and ranks the relative priorities of the information displayed in the first (un-obscured) region 542, and the second, third, and fourth regions 544, 546, 548 of the first display 510.

The method 700 determines whether there is any un-obscured area on the same display as the partially obscured display at 708. If so, the method 700 proceeds to 710, where a determination is made whether the obscured information is higher priority than the un-obscured information.

If the obscured information is of higher priority than the un-obscured information (at 710), then at 712, the information is re-positioned and displayed within the un-obscured area based on the priority ranking (determined at 706). In some embodiments, information having a relatively highest priority may be written to the un-obscured portion first, followed by slightly lower priority information being written to the un-obscured portion, and so on until the un-obscured portion is completely filled with displayed information.

An order of the plurality of overlapping displays (e.g. nearest to farthest) with respect to the user viewpoint is determined at 714. At 716, the method 700 determines a highest priority information from among the various information displayed by the plurality of overlapping display devices within the one or more overlap areas. For this purpose, the information of relatively lower priority that was not included within the un-obscured portion of the display at 712 may be temporarily allocated for display within the overlap area At 718, one or more intersection areas between the overlap areas and the region of highest priority information are determined, and at 720, the highest priority information from among the different displays is displayed within the intersection area(s) of the nearest unobstructed display(s). Thus, the method 700 displays the highest priority information in an un-obscured manner to the user using a plurality of overlapping display devices.

It will be appreciated that the additional embodiments described above with reference to FIGS. 7-15 may provide further advantages over the prior art. For example, providing a single processing component 450 that handles the processing and data manipulation functions for all of the displays of the plurality of overlapping displays may significantly improve operational efficiencies, may reduce system costs and complexity, and may extend the life of the power sources of the individual display devices. In addition, embodiments that are configured to determine regions of highest priority information within a given display device, and which re-position information within the same display device, may require less information to be communicated between displays, thereby improving operational efficiency and overall system responsiveness. Overall, such embodiments may allow the recognized advantages of electronic display media to be maintained and enhanced over conventional display media, even when such electronic display media are overlapping.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A coordination system relative to a first display, a second display, and a third display, comprising:
   one or more sensors configured to detect the second display relative to the first display, to detect the third display relative to the second display; and to detect the third display relative to the first display; and
   a processing component operatively coupled to the one or more sensors and to at least one of the first display, the second display, or the third display, the processing component configured to:
      determine an overlap area of the first display, the second display, and the third display relative to one another and a specified view location, wherein the overlap area includes a first portion of at least one of the first display, the second display, and the third display that is overlapped by a second portion of at least one of the other of the first display, the second display, and the third display;
      determine a nearest unobstructed display among the first display, the second display, and the third display relative to the specified view location; and
      operatively communicate with at least one of the first display, the second display, or the third display to cooperatively enable to be displayed within the nearest unobstructed display a highest priority information from the overlap area,
      wherein the highest priority information is displayed on at least two of the first display, the second display, and the third display when the highest priority information is included in the overlap area and a non-overlap area of at least one of the first display, the second display, and the third display.

2. A coordination system relative to a first display, a second display, and a third display, comprising:
   one or more sensors configured to detect the second display relative to the first display, to detect the third display relative to the second display, and to detect the third display relative to the first display; and
   circuitry operatively coupled to the one or more sensors and to at least one of the first display, the second display, or the third display, wherein the circuitry is configured to:
      determine an overlap area of the first display, the second display, and the third display relative to one another and a specified view location, wherein the overlap area includes a first portion of at least one of the first display, the second display, and the third display that is overlapped by a second portion of at least one of the other of the first display, the second display, and the third display;
determine a nearest unobstructed display among the first display, the second display, and the third display relative to the specified view location; and
operatively communicate with at least one of the first display, the second display, or the third display to cooperatively enable to be displayed within the nearest unobstructed display a highest priority information from the overlap area,
wherein the highest priority information is displayed on at least two of the first display, the second display, and the third display when the highest priority information is included in the overlap area and a non-overlap area of at least one of the first display, the second display, and the third display.

3. The coordination system of claim 2, wherein at least one of the first display, the second display, or the third display comprises at least one of an electronic document, or a monitor.

4. The coordination system of claim 2, wherein at least one of the first display, the second display, or the third display comprises an electronic paper device.

5. The coordination system of claim 2, wherein the circuitry is further configured to:
determine a highest priority area associated with the highest priority information, the highest priority area being less than or equal to the overlap area; and
operatively communicate with the at least one other display device to cooperatively enable to be displayed within the highest priority area of the overlap area of the nearest unobstructed display the highest priority information.

6. The coordination system of claim 2, wherein the circuitry is further configured to determine the overlap area using a first orientation indicium relating to the first display and a second orientation indicium relating to the at least one of the second display or the third display.

7. The coordination system of claim 6, wherein the first display is rotated with respect to the at least one of the second display or the third display.

8. The coordination system of claim 7, wherein the circuitry is further configured to:
determine a highest priority area associated with the highest priority information, the highest priority area being less than or equal to the overlap area; and cause to be displayed within the highest priority area of the overlap area of the nearest unobstructed display the highest priority information.

9. The coordination system of claim 2, wherein the one or more sensors are coupled to the first display.

10. The coordination system of claim 2, wherein the one or more sensors are distal from the first display.

11. A method of coordinating display on a first display, a second display, and a third display, comprising:
detecting the second display relative to the first display, the third display relative to the second display, and the third display relative to the first display; and
determining an overlap area of the first display, the second display, and the third display relative to one another and a specified view location, wherein the overlap area includes a first portion of at least one of the first display, the second display, and the third display that is overlapped by a second portion of at least one of the other of the first display, the second display, and the third display;
determining a nearest unobstructed display among the first display, the second display, and the third display relative to the specified view location; and
communicating with at least one of the first display, the second display, or the third display to cooperatively enable to be displayed within the nearest unobstructed display a highest priority information from the overlap area,
wherein the highest priority information is displayed on at least two of the first display, the second display, and the third display when the highest priority information is included in the overlap area and a non-overlap area of at least one of the first display, the second display, and the third display.

12. The method of claim 11, wherein at least one of the first display, the second display, or the third display comprises at least one of an electronic document, or a monitor.

13. The method of claim 11, wherein at least one of the first display, the second display, or the third display comprises an electronic paper device.

14. The method of claim 11, further comprising:
determining a highest priority area associated with the highest priority information, the highest priority area being less than or equal to the overlap area; and
communicating with the at least one other display device to cooperatively enable to be displayed within the highest priority area of the overlap area of the nearest unobstructed display the highest priority information.

15. The method of claim 11, further comprising determining the overlap area using a first orientation indicium relating to the first display and a second orientation indicium relating to the at least one of the second display or the third display.

16. The method of claim 11, wherein the first display is rotated with respect to the at least one of the second display or the third display.

17. The method of claim 11, further comprising determining a highest priority area associated with the highest priority information, the highest priority area being less than or equal to the overlap area; and cause to be displayed within the highest priority area of the overlap area of the nearest unobstructed display the highest priority information.

18. The method of claim 11, wherein detecting the second display relative to the first display, the third display relative to the second display, and the third display relative to the first display comprises detecting using one or more sensors coupled to the first display.

19. The method of claim 11, wherein detecting the second display relative to the first display, the third display relative to the second display, and the third display relative to the first display comprises detecting using one or more sensors distal from the first display.

* * * * *